(12) United States Patent
Gehrmann (10) Patent No.: US 8,209,550 B2
(45) Date of Patent: Jun. 26, 2012

(54) METHOD AND APPARATUS FOR PROTECTING SIMLOCK INFORMATION IN AN ELECTRONIC DEVICE

(75) Inventor: Christian Martin Gehrmann, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1015 days.

(21) Appl. No.: 11/962,356

(22) Filed: Dec. 21, 2007

(65) Prior Publication Data

US 2009/0007275 A1 Jan. 1, 2009

Related U.S. Application Data

(60) Provisional application No. 60/913,102, filed on Apr. 20, 2007.

(51) Int. Cl.
*G06F 21/00* (2006.01)
(52) U.S. Cl. ........................................ 713/193; 713/194
(58) Field of Classification Search .................... None
See application file for complete search history.

(56) References Cited

U.S. PATENT DOCUMENTS

| | | | | |
|---|---|---|---|---|
| 5,613,001 | A * | 3/1997 | Bakhoum | 380/254 |
| 5,864,757 | A | 1/1999 | Parker | |
| 6,314,283 | B1 * | 11/2001 | Fielden | 455/411 |
| 6,321,079 | B1 * | 11/2001 | Cooper | 455/411 |
| 7,054,613 | B2 | 5/2006 | Smeets | |
| 7,681,050 | B2 * | 3/2010 | Blom et al. | 713/194 |
| 8,032,181 | B2 * | 10/2011 | Hauck et al. | 455/558 |
| 2002/0038429 | A1 | 3/2002 | Smeets | |
| 2003/0014663 | A1 | 1/2003 | Sormunen et al. | |
| 2003/0220094 | A1 * | 11/2003 | Hicks | 455/410 |
| 2004/0101141 | A1 | 5/2004 | Alve | |
| 2004/0158736 | A1 | 8/2004 | Watt et al. | |
| 2004/0192386 | A1 * | 9/2004 | Aerrabotu et al. | 455/558 |

(Continued)

FOREIGN PATENT DOCUMENTS

EP 1076279 A 2/2001

(Continued)

OTHER PUBLICATIONS

Alves, Tiago and Felton, Don. TrustZone: Integrated Hardware and Software Security: Enabling Trust Computing in Embedded Systems. Information Quarterly, vol. 3, No. 4, 2004. 7 pgs.*

(Continued)

*Primary Examiner* — Nathan Flynn
*Assistant Examiner* — Michael R Vaughan
(74) *Attorney, Agent, or Firm* — Coats & Bennett, P.L.L.C.

(57) ABSTRACT

The teachings herein present a method and apparatus for protecting usage restriction data that governs usage of an electronic device. A cryptographic circuit supports secure and non-secure accesses. When non-securely accessed, it is operable only to verify the stored usage restriction data, and, when securely accessed, it is operable to generate a new message authentication code for changed usage restriction data, for subsequent authentication of that data. The usage restriction data may be stored in non-secure memory and may include static and dynamic parts. One or more embodiments include a secure circuit indicating whether the device has been initialized. The cryptographic circuit outputs a message authentication code for the static part using a permanent device key from the secure circuit, only if the device has not been initialized, and outputs a message authentication code for the dynamic part as needed to support authorized changes to the dynamic part.

11 Claims, 5 Drawing Sheets

U.S. PATENT DOCUMENTS

| | | | |
|---|---|---|---|
| 2004/0192388 A1 | 9/2004 | Dupuis et al. | |
| 2005/0033969 A1 | 2/2005 | Kiiveri et al. | |
| 2005/0037737 A1 | 2/2005 | Aubert | |
| 2005/0045717 A1* | 3/2005 | Rager et al. | 235/383 |
| 2005/0075092 A1* | 4/2005 | Kim | 455/411 |
| 2005/0097341 A1 | 5/2005 | Francis et al. | |
| 2005/0099832 A1 | 5/2005 | Becker | |
| 2005/0204155 A1 | 9/2005 | Ravi et al. | |
| 2005/0228980 A1 | 10/2005 | Brokish et al. | |
| 2005/0268092 A1 | 12/2005 | Shankar et al. | |
| 2006/0090084 A1 | 4/2006 | Buer | |
| 2006/0094462 A1 | 5/2006 | Nguyen et al. | |
| 2006/0129848 A1 | 6/2006 | Paksoy et al. | |
| 2006/0135208 A1 | 6/2006 | Lee | |
| 2006/0206710 A1 | 9/2006 | Gehrmann | |
| 2006/0246872 A1 | 11/2006 | Tarkkala | |
| 2007/0050622 A1 | 3/2007 | Rager et al. | |
| 2007/0067617 A1* | 3/2007 | Tarkkala | 713/2 |
| 2007/0067826 A1 | 3/2007 | Conti | |
| 2007/0092082 A1 | 4/2007 | Rush | |
| 2007/0094507 A1 | 4/2007 | Rush | |
| 2007/0118880 A1 | 5/2007 | Mauro, II | |
| 2007/0124409 A1 | 5/2007 | Sibert | |
| 2007/0143301 A1 | 6/2007 | Tran | |
| 2007/0150756 A1* | 6/2007 | Kudelski | 713/194 |
| 2007/0155363 A1* | 7/2007 | Rager et al. | 455/410 |
| 2007/0226795 A1* | 9/2007 | Conti et al. | 726/22 |
| 2008/0003980 A1* | 1/2008 | Voss et al. | 455/411 |
| 2008/0005577 A1* | 1/2008 | Rager et al. | 713/183 |
| 2008/0090614 A1* | 4/2008 | Sicher et al. | 455/558 |

FOREIGN PATENT DOCUMENTS

| | | | |
|---|---|---|---|
| JP | 2009065282 A | * | 3/2009 |
| WO | 0113198 A | | 2/2001 |
| WO | 2005116859 A | | 12/2005 |

OTHER PUBLICATIONS

Menezes, A.J. et al. "Handbook of Applied Cryptography," Library of Congress Cataloging-in-Publication Data, CRC Press, Inc., 1997, 4 pages.

Alves, T. et al. "TrustZone: Integrated Hardware and Software Security." White Paper, ARM, Jul. 2004. Available at http://www.arm.com/pdfs/TZ_Whitepaper.pdf.

Author Unknown. "Advanced Encryption Standard (AES)." Federal Information Processing Standards Publication 197 (FIPS PUB 197), Nov. 2001.

Trusted Computing Group. "TCG Specification Architecture Overview." Specification Revision 1.3, Mar. 28, 2007.

3RD Generation Partnership Project. "3GPP TS 22.022 V6.0.0 (Dec. 2004). 3rd Generation Partnership Project; Technical Specification Group Services and System Aspects; Personalisation of Mobile Equipment (ME); Mobile functionality specification (Release 6)." Dec. 2004.

Author Unknown. "Achieving Stronger SIM-Lock and IMEI Implementations on Open Terminals using ARM TrustZone Technology." White Paper, ARM, publication date unknown. Available at: http://www.arm.com/miscPDFs/15500.pdf.

* cited by examiner

METHOD AND APPARATUS FOR PROTECTING SIMLOCK INFORMATION IN AN ELECTRONIC DEVICE

RELATED APPLICATIONS

This application claims priority under 35 U.S.C. §119(e) from the U.S. Provisional Patent Application Ser. No. 60/913,102, which was filed on 20 Apr. 2007 and entitled "Enhanced Hardware Protected SIMLock."

BACKGROUND

1. Technical Field

The present invention generally relates to electronic device security, and particularly relates to protecting Subscriber Identity Module Lock ("SIMLock") information or like enabling data in an electronic device.

2. Background

Electronic devices, particularly mobile communication devices such as cellular radiotelephones, are oftentimes sold subject to one or more usage restrictions. For example, a device may be restricted to work only in certain countries, only with certain communication networks and/or service providers. Subscriber Identity Module (SIMs) can play a key role in enforcing such restrictions, whether implemented as hardware in card form, or implemented in software.

In particular, a device may include security elements that enforce a "SIM Lock," abbreviated herein as "SIMLock," which restricts the SIMs that can be used with the device. For example, the SIMLock on a given device may be configured to lock the device to accept SIMs only from a specific network operator, or only for a specific country. As a further example, some devices include SIMLocks that lock those devices to specific SIMs, thereby disallowing swapping of SIM information from one device to another. An operator might, for example, equip "premium" or high-capability devices with that type of restrictive SIMLock, to ensure that any purchase subsidies provided by the operator are recouped through long-term subscription agreements.

Removing, disabling, or otherwise circumventing SIM-Locks, all of which may be generally referred to as SIMLock fraud, represents a significant expense to network operators, because it partially or wholly prevents them from receiving expected subscription contract revenues. To that end, there is significant interest in developing SIMLock mechanisms that are difficult to defeat or otherwise circumvent, but which are also practical from economic and circuit implementation perspectives.

For example, Advanced Risc Machines® (ARM®) provides a secure processing architecture marketed under the TrustZone® brand. TrustZone® integrates hardware and software security, in part by providing dual-processing environments, including a secure processing environment, which may be used for SIM verification and related processing, and a non-secure environment, which may be used for general device processing. Further examples of secure processing environment provisions with applicability to SIM-related processing involve the Trusted Computing Group™, which is an association of various companies, including AMD®, Intel®, HP®, and others.

SUMMARY

The teachings herein present a method and apparatus for protecting usage restriction data that governs usage of an electronic device. A cryptographic circuit supports secure and non-secure accesses. When non-securely accessed, it is operable only to verify the stored usage restriction data, and, when securely accessed, it is operable to generate a new message authentication code for changed usage restriction data, for subsequent authentication of that data. The usage restriction data may be stored in non-secure memory and may include static and dynamic parts. One or more embodiments include a secure circuit indicating whether the device has been initialized. The cryptographic circuit outputs a message authentication code for the static part using a permanent device key from the secure circuit only if the device has not been initialized, and outputs a message authentication code for the dynamic part as needed to support authorized changes to the dynamic part.

Advantageously, in one or more embodiments, the cryptographic circuit and the secure circuit are implemented together as part of an Application Specific Integrated Circuit (ASIC) or a System-on-a-Chip (SoC). Whether or not so implemented, the secure circuit may comprise, for example, a plurality of one-time programmable elements, such as fuses or anti-fuses. In at least one embodiment, the permanent device key is recorded as a secret key via a subset of the one-time programmable elements, and is accessible only to the cryptographic circuit. Likewise, one or more of the one-time programmable elements may be used as a permanent indicator of whether the device has been initialized, e.g., it is "burnt" during device initialization.

Thus, in one or more embodiments, an electronic device comprises a first memory for holding stored usage restriction data and a stored message authentication code for authenticating the stored usage restriction data, a secure circuit holding a permanent device key, and a cryptographic circuit connected to the secure circuit. The cryptographic circuit is operable, when non-securely accessed, to authenticate the stored usage restriction data using the stored message authentication code and the permanent device key but not operable to output a new message authentication code for the stored usage restriction data. Further, the cryptographic circuit is operable, when securely accessed, to generate a new message authentication code using the permanent key and changed usage restriction data that has been generated via authorized modification of the stored usage restriction data, and to output the new message authentication code for storage in the first memory along with the changed usage restriction data. In at least one such embodiment, the first memory advantageously comprises a non-secure memory.

Further, in at least one such embodiment, the electronic device further comprises a system processor configured to operate selectively in secure and non-secure modes. The system processor is operable to non-securely access the cryptographic circuit for authenticating the stored usage restriction data, and to securely access the cryptographic circuit to obtain the new message authentication code for the changed usage restriction data. The system processor in one or more embodiments is further operable in the secure mode to generate the changed usage restriction data responsive to executing secure program instructions, which may be protected in a secure memory. As a non-limiting example, the system processor may be configured at least in part according to ARM® Trust-Zone® or Trusted Computing Group™ specifications. More generally, the system processor provides secure and non-secure processing domains and is operable to change between them.

For example, in at least one embodiment, the electronic device includes a secure watchdog timer that resets the system processor unless timely serviced in secure mode by the system processor. Complementing that arrangement, the system processor is configured to reset into the secure mode, such that the secure watchdog timer forces the system processor to enter the secure mode if not timely serviced by the system processor.

In one or more other embodiments, a method of protecting usage restriction data that governs usage of an electronic device comprises storing the usage restriction data as stored usage restriction data in a first memory of the electronic device, along with a stored message authentication code for authenticating the stored usage restriction data, and storing a permanent device key in a secure circuit. The method further includes, if in a non-secure mode of operation, authenticating the stored usage restriction data using the stored message authentication code and the permanent device key but not generating any new message authentication codes for the stored usage restriction data. Still further, the method includes, if in a secure mode of operation, selectively generating a new message authentication code using the permanent key and changed usage restriction data that has been generated via authorized modification of the stored usage restriction data, and outputting the new message authentication code for storage in the first memory along with the changed usage restriction data.

In at least one such embodiment, the method includes storing the usage restriction data and the corresponding message authentication code(s) in non-secure memory. With or without that detail, however, the method also may include operating in the secure mode and in the non-secure mode based on a system processor of the electronic device dynamically changing between the secure and the non-secure modes of operation. In such embodiments, making the authorized modification of the stored usage restriction data may comprise execution by the system processor of secure program instructions, which may be stored in a secure memory.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
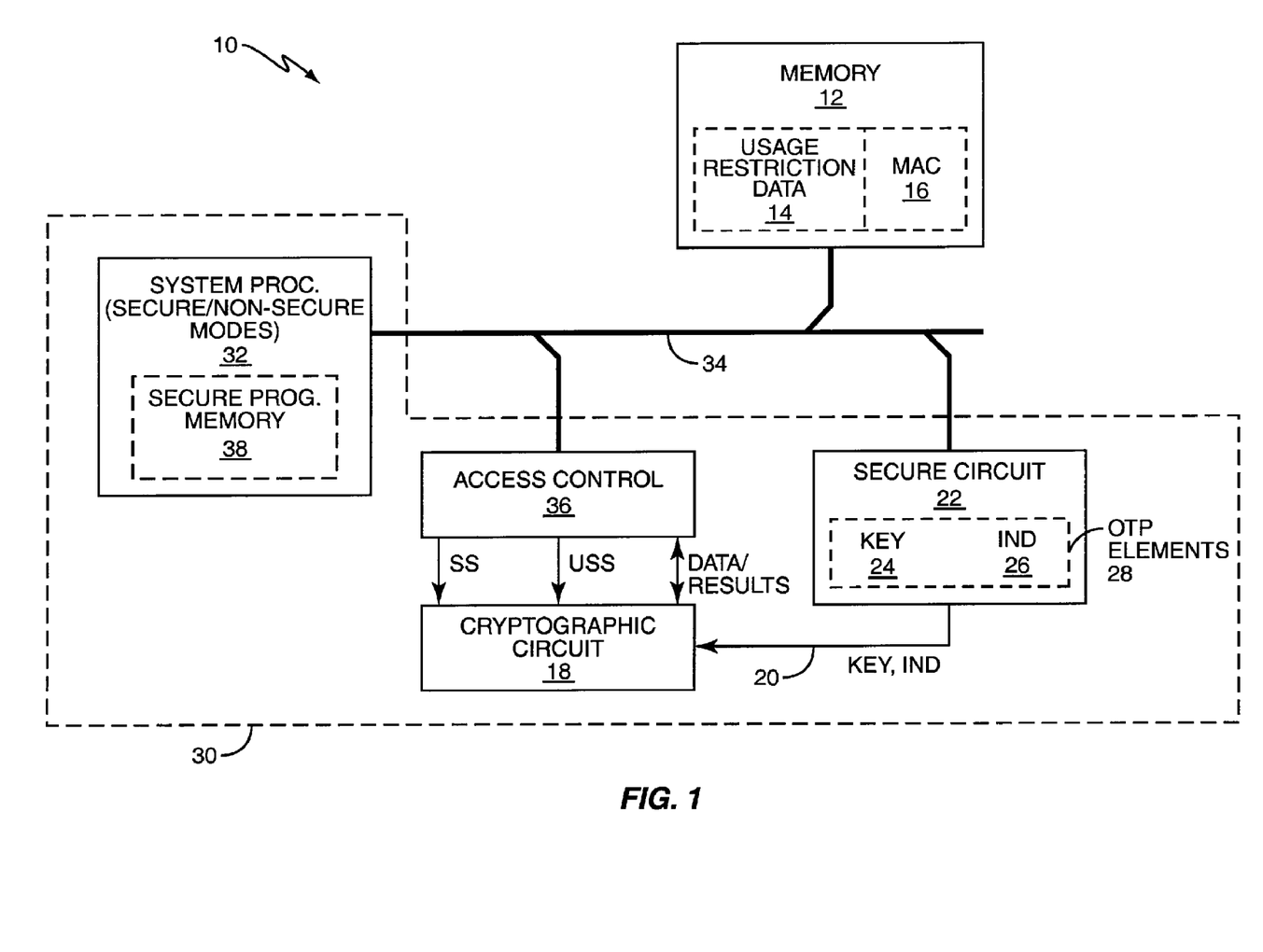
FIG. 1 is a block diagram of one embodiment of an electronic device as taught herein.

As a non-limiting example, FIG. 1 illustrates an electronic device 10 that includes a memory 12 holding usage restriction data 14 that is intended to limit or otherwise restrict how the device 10 is used. Correspondingly, the memory 12 holds a message authentication code (MAC) 16 that is used for authenticating the usage restriction data.

As an example, the MAC 16 may be calculated as, for example, a keyed-hash message authentication code (HMAC) based on the Secure Hash Algorithm (SHA) 256. Many other MAC generation functions are known, and may be used as needed or desired. Broadly, the MAC 16 is calculated as a function of a (secret) key and a data string, i.e., the MAC 16 is defined as $f$ (key, string), where "$f$" is the desired derivation function. Thus, as an initial storage procedure, the MAC 16 can be calculated for known, valid usage restriction data 14 using a secret key. That valid usage restriction data 14 and the corresponding MAC 16 are stored in the memory 12 and unauthorized changes to the usage restriction data 14 can be detected by retrieving the data from memory, calculating a MAC for the retrieved data using the same key and MAC derivation function, and then comparing that calculated MAC to the MAC 16 stored in the memory 12.

Detecting data tampering in this manner is important in a number of applications, such as where the device 10 comprises a cellular radiotelephone or other wireless communication device or module sold subject to usage restrictions. In such embodiments, the usage restriction data may comprise, as explained earlier herein, Subscriber Identity Module Lock ("SIMLock") information that restricts usage of the device 10.

Advantageously, the device 10 includes a cryptographic circuit 18 to authenticate the stored usage restriction data 14 and, when appropriate, to provide a newly calculated MAC 16, such as for initially determining the MAC as part of device initialization or for determining a new MAC to reflect authorized changes to the usage restriction data 14. The cryptographic circuit 18 may be, for example, a hardware-based circuit having logical circuit structures or otherwise programmed to carry out desired cryptographic processing functions. As taught herein, the cryptographic circuit 18 has a connection 20 to a secure circuit 22, which securely holds a key 24 that is unique to the device 10 in one or more embodiments, and provides an indicator 26 that indicates whether the device 10 has been initialized (such as might be done by the device manufacturer during initial configuration or provisioning of the device). Thus, the secure circuit 22 may include a plurality of one-time programmable (OTP) elements 28, such as fuses or anti-fuses, for use in permanently storing the key 24 and for permanently setting the initialization indicator 26 after the device 10 has been initialized.

In at least one embodiment, the connection 20 is a direct connection, or at least is not available for use by other hardware or software entities in the device 10, meaning that only the cryptographic circuit 18 has access to the key 24, or to an encrypted version of it. Further, the cryptographic circuit 18 may be configured such that it never outputs the key 24, practically meaning that the key 24 is unknown and undiscoverable. Still further, the cryptographic circuit 18 and the secure circuit 22 may be implemented as parts of an integrated module 30, which may comprise an Application Specific Circuit (ASIC), System-on-a-Chip (SoC), or other such packaged circuit. Advantageously, such physical packaging can be designed to prevent any non-destructive access to the interface between the secure circuit 22 and the cryptographic circuit 24.

With the above non-limiting details in mind, then, it will be understood that the device 10 in one or more embodiments comprises a first memory, e.g., the memory 12, for holding stored usage restriction data 14 and a stored message authentication code 16 for authenticating the stored usage restriction data. The device 10 further comprises the secure circuit 22 holding a permanent device key 24, and the cryptographic circuit 18, which is connected to the secure circuit 22 and is operable, when non-securely accessed, to authenticate the stored usage restriction data 14 using the stored message authentication code 16 and the permanent device key 24 but is not operable to output a new message authentication code for the stored usage restriction data 14. Further, the cryptographic circuit 18 is operable, when securely accessed, to generate a new message authentication code using the permanent key 24 and changed usage restriction data that has been generated via authorized modification of the stored usage restriction data, and to output the new message authentication code for storage in the first memory along with the changed usage restriction data.

For example, one or more elements of the stored usage restriction data 14 may be modified to obtain changed usage restriction data 14', where the "prime" mark after the reference number textually denotes changed usage data. Thus, in support of authorized modification procedures, the cryptographic circuit 18 uses the key 24 to generate a new MAC, i.e., MAC 16', from the changed usage restriction data 14'. The old usage restriction data 14 may be overwritten in whole or in part by the changed usage restriction data 14', and the updated MAC 16' may be stored in the memory 12 along with the updated data for later authentication of that updated data. Unless necessary herein for clarity, the usage restriction data and the MAC stored in the memory 12 are denoted, respectively, using the reference numbers 14 and 16, even if they represent changed/updated values.

With the security protections against unauthorized data modifications afforded by the cryptographic circuit 18 and the secure circuit 22, the memory 12 may be advantageously implemented as non-secure memory, e.g., non-secure FLASH or other non-volatile memory. Use of non-secure memory generally saves money and simplifies the design, construction, testing, and operation of the device 10.

Turning back to the example of FIG. 1, one sees that the device 10 includes, in one or more embodiments, a system processor 32, which may or may not be integrated into the module 30. The system processor 32 may have a "secure domain" and a "non-secure domain," and may be configured, for example, according to ARM® TrustZone® or TCG™ standards or recommendations. Broadly, the system processor 32 is configured for selective operation in secure and non-secure modes, and it is coupled to the cryptographic circuit 18 through one or more bus/interface circuits 34. That coupling may be indirect, such as through an access control circuit 36, which indicates/controls whether the cryptographic circuit 18 is being securely or non-securely accessed.

Advantageously, then, the cryptographic circuit 18 is configured for secure and non-secure accesses, and the system processor 32 therefore may make use of the cryptographic circuit 18 in secure mode and in non-secure mode. However, the cryptographic circuit 18 is, as detailed above, configured to behave differently and to provide different functions, depending on whether it is securely or non-securely accessed. This arrangement allows the cryptographic circuit 18 to be used for secure operations and non-secure operations, without compromising the integrity of those secure operations.

In at least one embodiment, then, the cryptographic processor 18 is available to the system processor 32 in non-secure mode, for authenticating stored usage restriction data 14, but not for generating and outputting new MACs that can be used to authenticate updated usage restriction data. Indeed, the cryptographic circuit 18 is, in one or more embodiments, further available via non-secure access for a range of cryptographic processing support tasks that are helpful to the device 10. However, only when securely accessed is the cryptographic circuit 18 available for generating new MACs to be used for authenticating changed usage restriction data.

Thus, in one or more embodiments, the system processor 32 is configured to operate selectively in secure and non-secure modes. The system processor 32 is operable to non-securely access the cryptographic circuit 18 for authenticating the stored usage restriction data 14, and is operable in the secure mode to generate the changed usage restriction data responsive to executing secure program instructions and securely access the cryptographic circuit to obtain the new message authentication code for the changed usage restriction data. In at least one such embodiment, a network operator or service provider's agent has a computer system that couples to the device 10 and is configured with the proper authorization codes to control or otherwise initiate the changing of the usage restriction data. In other instances, the device 10 may, by way of the system processor 32 and secure program instructions, be set up to allow over-the-air (OTA) changes, such as part of an authorized re-provisioning process.

Thus, the device 10 in one or more embodiments includes secure program memory 38, which may or may not be integrated with the system processor 32, but which generally is protected within the secure domain of the system processor 32. The program instructions supporting changing of the stored usage restriction data therefore may be safely stored in the secure program memory 38, for access by the system processor 32 as part of authorized updating procedures.

Figures 2, 3:
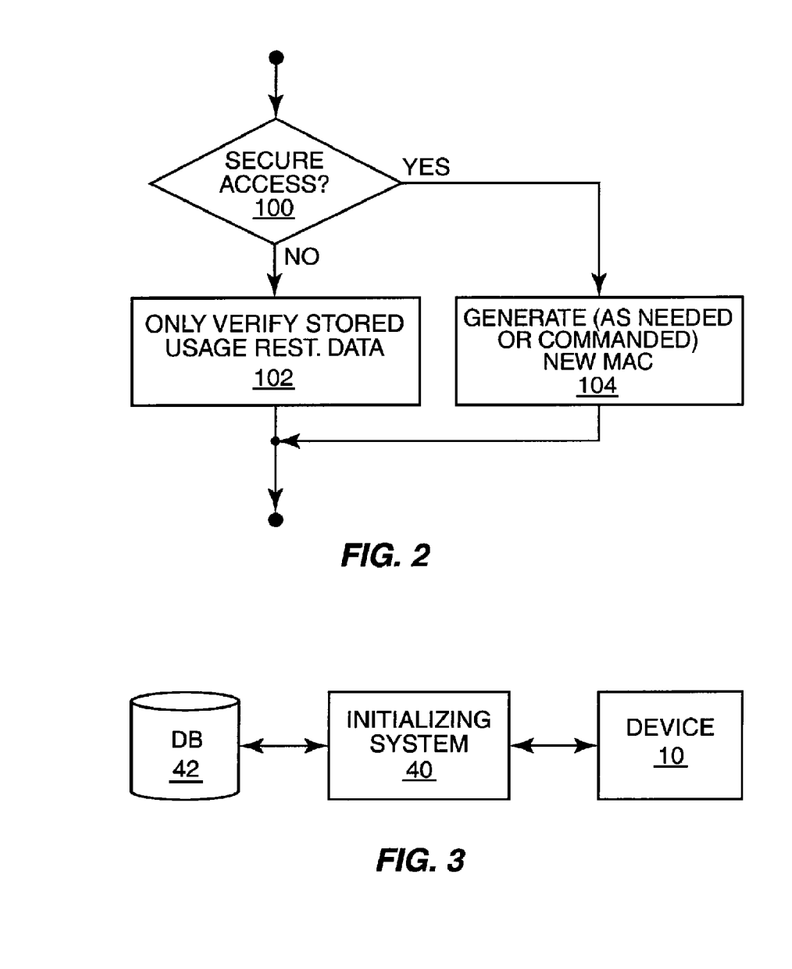
FIG. 2 is a logic flow diagram of one embodiment of cryptographic processing as taught herein for supporting information authentication.
FIG. 3 is a block diagram of one embodiment of an initialization system, which may be used to initialized usage restriction information in an electronic device.

FIG. 2 illustrates one example of conditioning the behavior of the cryptographic circuit 18 on the type of access. Such processing may be implemented via logic circuits, firmware, or by some other mechanism within the cryptographic circuit 18. In any case, the illustrated processing begins with cryptographic circuit 18 being accessed. Thus, the cryptographic circuit 18 determines whether the access is secure or non-secure (Block 100). If the access is non-secure, the cryptographic circuit 18 will, with respect to the stored usage restriction data 14, only perform verification (authentication) functions (Block 102). More particularly, the stored restriction data 14 and the corresponding stored MAC 16 may be read in by (or otherwise provided to) the cryptographic circuit 18, in which case the cryptographic circuit 18 subsequently outputs an indication of whether the stored restriction data 14 is or is not authentic. However, the cryptographic circuit 18 will not generate and output new MACs for changed usage restriction data when non-securely accessed.

Conversely, if the access is secure, the cryptographic circuit 18 performs authentication and/or generation of new MACs for changed usage restriction data (Block 104). For example, the cryptographic circuit 18 may be securely accessed by the system processor 32 and provided with changed usage restriction data, with a command or other indication that a new MAC is to be generated for the changed usage restriction data using the secret key 24. In general, such actions may be done on an "as needed" or "as commanded" basis. Further, broadly, the cryptographic circuit 18 in one or more embodiments may recognize a number of commands and/or may be configured to carry out defined processing depending on which mode it is accessed in, and on what data is given to it.

Of course, as explained earlier, the extent or nature of cryptographic support provided by the cryptographic circuit 18 may, in addition to being linked to the type of access (secure or non-secure), be linked to whether the device 10 has been initialized. As noted, the indicator 26, which may be a fuse/anti-fuse or other type of OTP, is used as a permanent and secure indicator of the device's initialization state.

FIG. 3 illustrates by way of non-limiting example an initialization system 40, which may comprise a computerized manufacturing/initializing system operating securely at a device manufacturer. The initialization system 40 has access to a database 42 or other data store that includes initial or default usage restriction information. As an example, the device vendor operating the initialization system 40 may provide devices 10 to more than one network operator, and/or may provide a range of device types, ranging, for example, from simple communication modules to sophisticated smart phones. In either case, the database 42 may include different sets of default usage restrictions defined for particular network operators and/or for particular device models.

A given device 10 thus can be loaded with standard or default usage restriction data as part of the initialization process. In one or more embodiments, the default restriction data comprises, for example, static authorization data which defines key or passcode values that are used to authorize changes to usage restrictions, and dynamic data that comprises the rules or settings that define such restrictions. Generally, the static data is not intended to change for the life of the device 10, and the dynamic data is intended to change only under secure operating conditions upon proper authorization.

Figure 4:
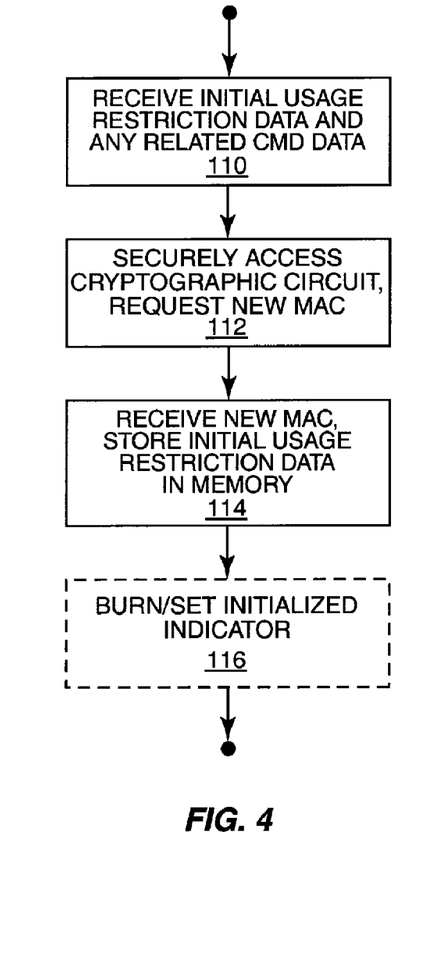
FIGS. 4 and 5 are related logic flow diagrams of one embodiment of processing in support of storing initial usage restriction data and generating and storing authentication information for that data.

FIG. 4 illustrates an example of processing, from the perspective of the device 10. Processing begins with the device 10 receiving initial usage restriction data and any related command/configuration data for performing an authorized device initialization (Block 110). Processing continues with securely accessing the cryptographic circuit 18, for requesting or otherwise obtaining a MAC for the initial usage restriction data (Block 112). (The cryptographic circuit 18 generates that MAC by processing the initial usage restriction data, e.g., hashing it, using the secret key 24, which includes using the key 24 directly or deriving a key from the key 24 as might be done for added security.

The system processor 32 or other entity within the device 10 or the initializing system 40 receives the newly generate MAC, and causes the initial usage restriction data and that MAC to be stored in the memory 12 as the stored usage restriction data 14 and the corresponding stored MAC 16 (Block 114). Then, the device 10 or the initializing system 40 causes a programming signal to be applied to the secure circuit 22, to permanently set the initialization indicator 26, to indicate that the device 10 has been initialized (Block 116). Advantageously, that indication is used in one or more embodiments to disallow the cryptographic circuit 18 from ever calculating a new MAC for one or more parts of the initial usage restriction data just stored in the memory 12. That arrangement means that those one or more parts of the initial usage restriction data itself cannot be altered and re-authenticated once the device 10 has been initialized. In at least one embodiment, then, the initial usage restriction data comprises static authorization values for which the device 10 will not calculate a new MAC once the initialization indicator 26 is set, and dynamic values (rules or settings), which can be changed later and for which new MAC values can be calculated, but only by authorization against the static authorization values according to secure processing operations.

Figure 5:
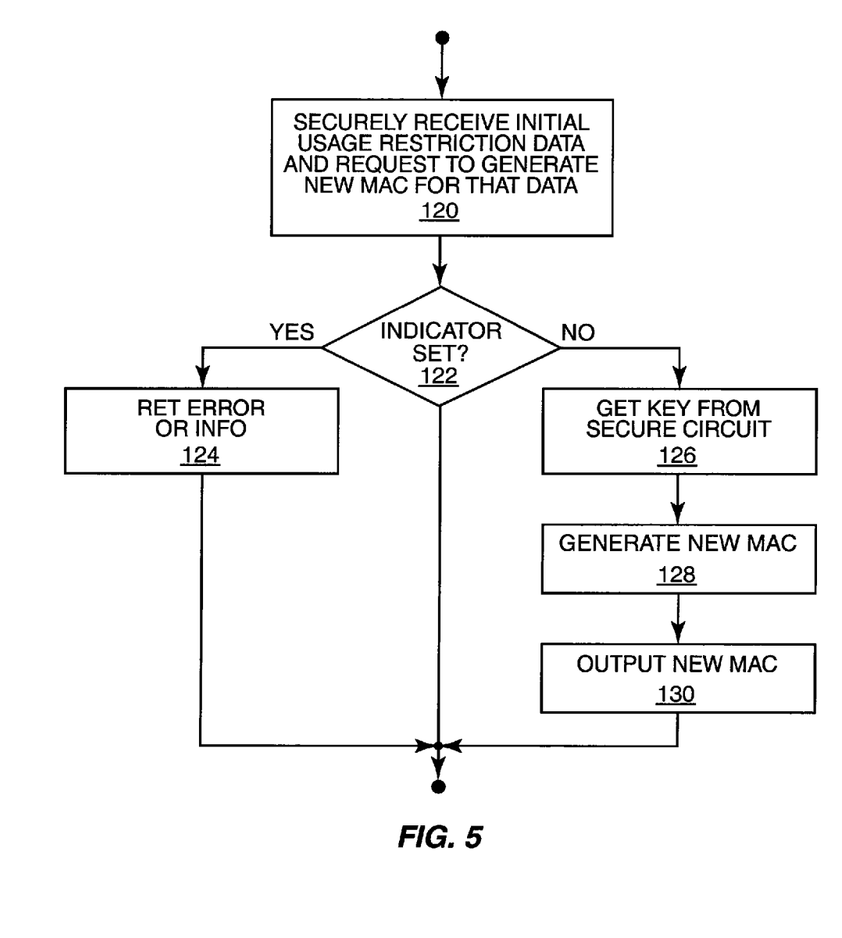

FIG. 5 illustrates the effect of that restriction on processing by the cryptographic circuit 18. FIG. 5 more particularly represents processing performed by the cryptographic circuit 18 within the initialization processing context of Bock 112 in FIG. 4. Thus, the illustrated processing begins with the cryptographic circuit 18 receiving the initial usage restriction data (e.g., directly or indirectly from the initializing system 40), and an accompanying request or indication that the cryptographic circuit 18 should generate and output a MAC for the initial usage restriction data (Block 120). The cryptographic circuit 18 therefore checks whether the indicator 26 indicates that the device 10 has been initialized (Block 122). If it has, the cryptographic circuit 18 will not generate the MAC. To make that failure visible, in at least one embodiment, the cryptographic circuit 18 returns error or other information (Block 124).

If the indicator 26 does not indicate that the device 10 has been initialized, the cryptographic circuit 18 obtains the key 24 in clear form or encrypted form from the secure circuit 22 via the connection 20 (Step 126). The cryptographic circuit 18 then generates the new MAC, e.g., as $f$ (key 24, initial usage restriction data) (Block 128), and outputs the new MAC for storage in the memory 12 (Block 130), such as may be done under control of the system processor 32. However, it is contemplated herein that at least one embodiment of the cryptographic circuit 18 includes at least limited memory interfacing capability, meaning that the cryptographic circuit 18 may be able to write MACs into the memory 12 and/or to retrieve stored usage data 14 and stored MACs 16 from the memory 12.

Figure 6:
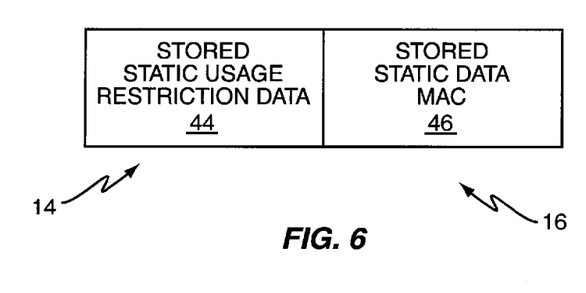
FIG. 6 is a diagram of one embodiment of stored data that includes stored static usage restriction information and a corresponding stored message authentication code (MAC).

FIG. 6 illustrates the data storage for the memory 12 as the result the above initialization processing. One sees that the stored usage restriction data 14 comprises "stored static usage restriction data 44" connoting that it is default or starting usage restriction data loaded into the device 10 as part of authorized initialization of the device 10. More pertinently, the term "static usage restriction data" connotes usage restriction data that is intended never to change for the life of the device 10. Correspondingly, the stored MAC 16 comprises a "stored static data MAC 46," which is intended for subsequent use in authenticating the stored static usage data 44.

Figure 7:
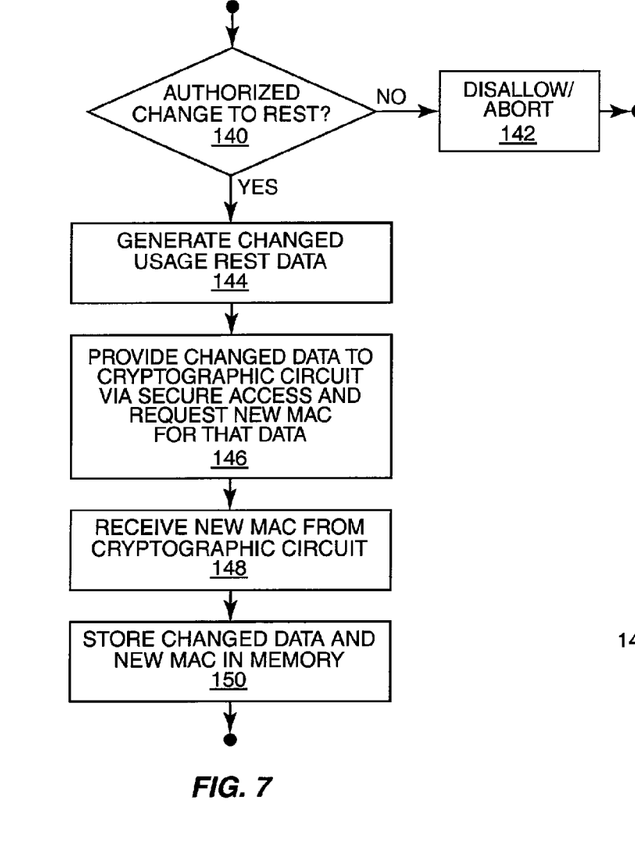
FIGS. 7 and 8 are related logic flow diagrams of one embodiment of processing in support of storing changed usage restriction data and generating and storing authentication information for that data.

FIG. 7 illustrates processing by, for example, the system processor 32, for conducting authorized changes to the device's usage restrictions. Processing begins with the system processor 32 determining whether the attempted change is authorized (Block 140). This may be done in secure mode, based on the system processor 32 verifying authorization passwords/pass codes, or the like, which may be stored in encrypted form in the static usage restriction data 44, or the one-way hash of password/pass codes are stored in the static usage restriction data 44. If the change is not part of authorized processing, the system processor disallows changes and aborts (Block 142).

In at least one embodiment, the static usage restriction data 44 is itself never changed. For example, the static usage restriction data 44 comprises encrypted or one-way hash values of passkeys that are used as authorization values for changing dynamic usage restriction data, that itself can be protected by a different MAC. In this case, the dynamic usage restriction data can be understood as data containing the rules that determine locking to a certain SIM and/or network, etc. Hence, after a successful authorization of the user, that user may be allowed to change one or more settings defined by the dynamic usage restriction data, but the underlying authorization data embodied in the static usage restriction data 44 is not changed, e.g., static SIM lock keys used for authorizing SIM Lock changes would not be changed.

On the other hand, if the change is authorized, the system processor 32 generates the changed usage restriction data. For example, after an initial service contract expires for the device 10, its owner may wish to use the device with another service provider, or at least have the option of using with other than the original service provider's network. Thus, using authorized procedures, changes may be made to the dynamic usage restriction data. This operation can be understood as generating or otherwise receiving changed usage restriction data (Block 144). In at least one embodiment, the "changed usage restriction data" represents changes or updates to the settings embodied in or otherwise set by the dynamic usage restriction data. Such data is provided to the cryptographic circuit 18 via a secure access request, along with any required accompanying request for new MAC generation for that data (Block 146). In response, the cryptographic circuit 18 generates a new MAC from the changed usage restriction data. The system processor receives the new MAC from the cryptographic circuit 18 (Block 148) and stores the changed usage restriction data and the corresponding new MAC in the memory 12 (Block 150).

Figure 8:
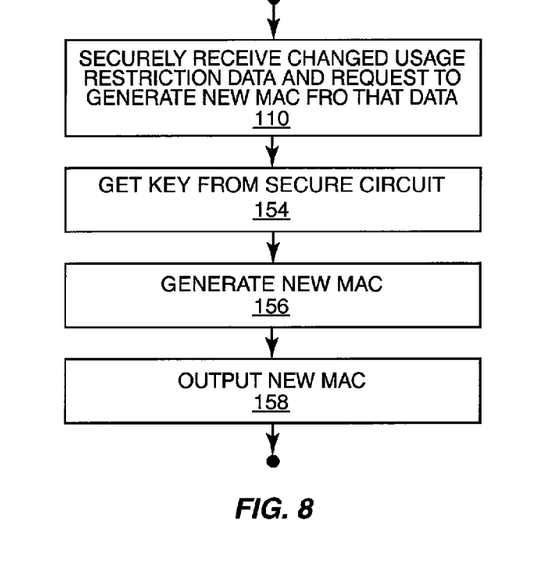

FIG. 8 represents one embodiment of processing by the cryptographic circuit 18 in support of the above overall processing. Particularly, FIG. 8 represents one embodiment of cryptographic circuit processing done in response to the cryptographic circuit 18 receiving the changed usage restriction data via a secure access, as was described for Block 146 in FIG. 7.

Processing in FIG. 8 thus begins with the cryptographic circuit 18 securely receiving the changed usage restriction data and any accompanying request or indication that a new MAC is desired for such data (Block 152). Processing continues with the cryptographic circuit 18 obtaining the permanent key 24 from the secure circuit 22 (via the connection 20) (Block 154), and generating the new MAC accordingly (Block 156), e.g., the new MAC=g (key 24, changed usage restriction data), where g(•) indicates a MAC generation function that preferably is different from the MAC generation function ƒ(•) used in association with MAC generation for the static usage restriction data 44. Processing continues with the cryptographic circuit 18 outputting the new MAC for storage in the memory 12, along with the changed usage restriction data.

Figure 9:
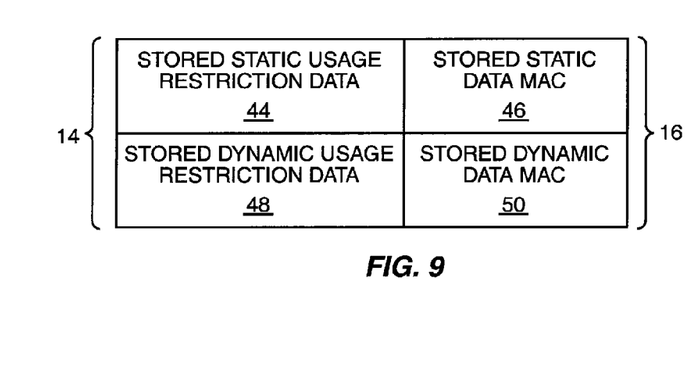
FIG. 9 is a diagram of one embodiment of stored data that includes stored static usage restriction information and a corresponding stored MAC, and further includes stored dynamic usage restriction information and a corresponding stored MAC.

FIG. 9 illustrates one embodiment of the data and MAC arrangement arising from the above processing. As illustrated, after engaging in an authorized modification of the device's usage restrictions, the usage restriction data 14 actually comprises two parts: the stored static usage restriction data 44, which was loaded into the device 10 as part of its initialization (e.g., at the factory); and stored dynamic usage restriction data 48 that was generated within or otherwise provided to the device 10 as part of an authorized procedure intended to modify the device's usage restrictions. Correspondingly, the MAC 16 actually comprises a first MAC for authenticating the stored static usage restriction data 44, i.e., the stored static data MAC 46, and a second MAC for authenticating the stored dynamic usage restriction data 48, i.e., the stored dynamic data MAC 50. For example, as noted earlier, the MAC 46 may be obtained as ƒ (key 24, static usage restriction data) and the MAC 50 may be obtained as g (key 24, changed usage restriction data).

With FIG. 9 in mind, then, it will be understood that the stored usage restriction data 14 may comprise a static part 44 and a dynamic part 48 and the stored MAC 16 correspondingly may comprise a first stored MAC 46 for authenticating the static part and a second stored MAC 50 for authenticating the dynamic part. In such contexts, an embodiment of the cryptographic circuit 18 is operable, when securely accessed, to generate and output a new MAC for the static part of the stored usage restriction data 14 for storage in the first memory as the first stored MAC 46 only if the indicator 26 indicates that the device 10 has not been initialized. Further, the cryptographic circuit 18 in such an embodiment is operable, when securely accessed, to generate and output a new MAC for the dynamic part of the stored usage restriction data 14 for storage in the first memory as the second stored MAC 50 responsive to secure commands provided to it via secure access by the system processor 32.

This arrangement allows the device to be initialized with authorization codes/keys for storage as the stored static usage restriction data 44 and with initial usage restrictions as defined by the stored dynamic usage restriction data 48. The corresponding stored static data MAC 46 and stored dynamic data MAC 50 are stored for the static and dynamic usage restriction data 44 and 48. As noted, burning or otherwise setting the initialization indictor prevents the calculation of new MAC for the stored static usage restriction data 44, meaning that post-initialization changes to the stored static usage restriction data 44 can not be authenticated. However, with proper authorization verification against the stored static usage restriction data 44, the cryptographic circuit 18 can be made to calculate a new MAC for changed (dynamic) usage restriction data. That functionality allows authorized changes to be made to the dynamic usage restriction data for storage as the stored dynamic usage restriction data 48, and allows a correspondingly updated MAC to be calculated and stored as the stored dynamic data MAC 50. This processing thus enables later authentication of authorized changes made to the dynamic part of the stored usage restriction data 14.

Figure 10:
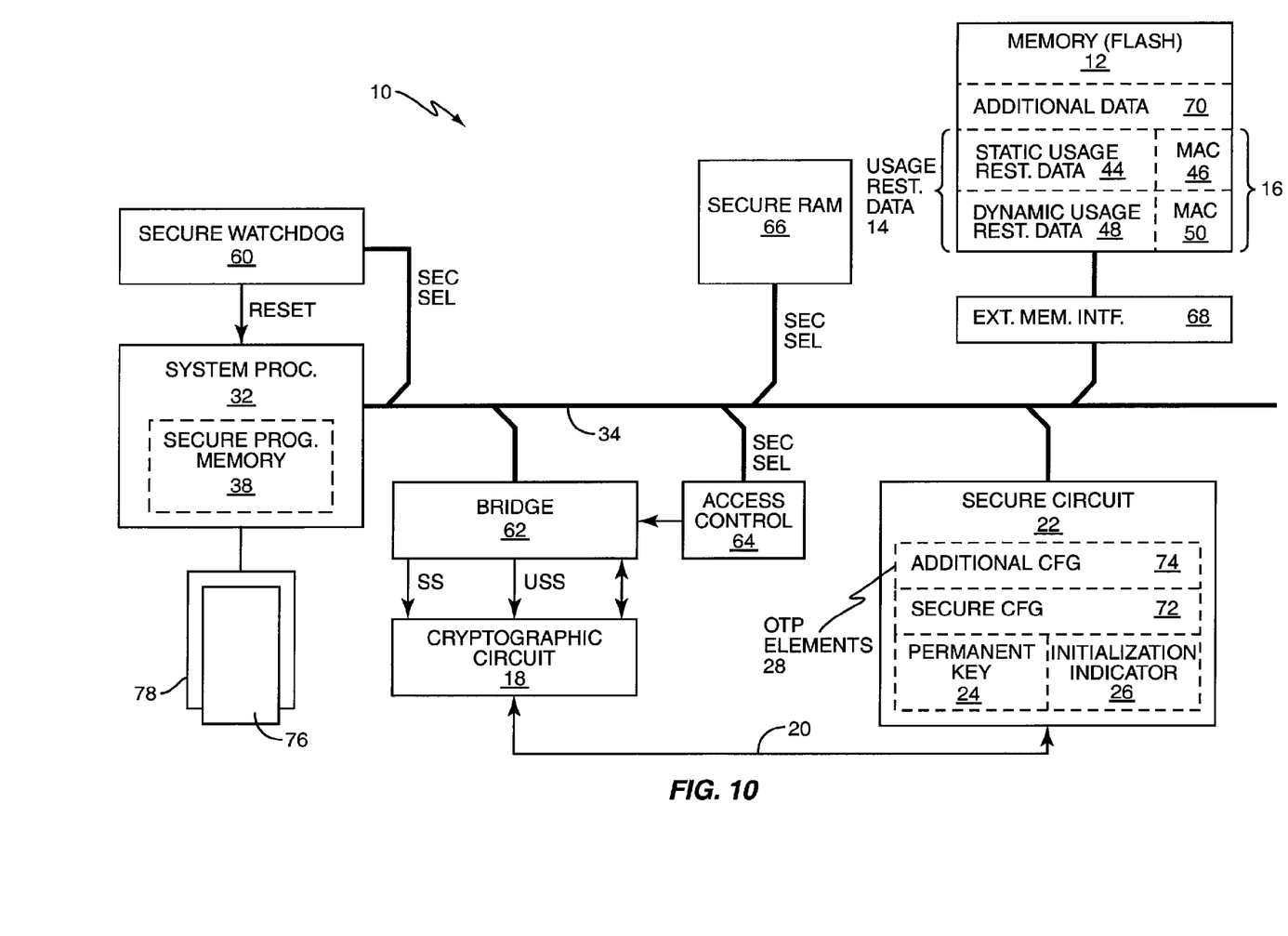
FIG. 10 is a block diagram of another embodiment of an electronic device as taught herein.

Turning to other aspects of the device 10, FIG. 10 provides example details for another embodiment of the device 10. In addition to the previously illustrated elements, the illustrated device 10 includes a secure watchdog timer circuit 60 to ensure periodic entry of the system processor 32 into secure mode, a bridge circuit 62 and an access control circuit 64 functioning as the earlier illustrated access circuit 36, a secure RAM 66, and an external memory interface 68 to interface with external memory embodiments of the memory 12. Further, the memory 12 may include additional data 70, such as configuration data, user data, etc., and the secure circuit 22 also may include additional OTP elements or other storage (memory) for holding additional security configuration data 72 and/or other configuration data 74. Still further, the device 10 includes a SIM card 76, or at least includes a SIM card circuit interface 78, for receiving and communicating with a SIM card 76.

In at least one embodiment of the illustrated device 10, the system processor 32 is configured to start in the secure mode responsive to a reset, and the secure watchdog timer circuit 60 is configured to reset the system processor 32 unless periodically serviced by the system processor 32 operating in the secure mode. That is, unless the system processor enters secure mode and services (resets) the secure watchdog timer circuit 60 before the watchdog's timed interval expires, the secure watchdog timer circuit 60 asserts a reset signal for the system processor 32, causing it to reboot/restart and enter the secure mode. In at least one such embodiment, the system processor 32 is configured to start in the secure mode responsive to a reset and to periodically serve the secure watchdog timer 60, at least in part by authenticating the stored usage restriction data 14 and checking it against Subscriber Identity Module (SIM) settings for the electronic device (which are held, for example, in the SIM 76), wherein the secure watchdog timer 60 is configured to reset the system processor 32 unless periodically served by the system processor 32 operating in the secure mode.

Correspondingly, the system processor 32 may be configured to, as a defined part of its secure mode processing, use the cryptographic circuit 18 to authenticate the stored static usage restriction data 44 and/or the stored dynamic usage restriction data 48. To do so, the cryptographic circuit 18 is provided with (or reads in) the stored static usage restriction data 44 and the corresponding stored static data MAC 46, and is provided with (or reads in) the stored dynamic usage restriction data 48 and the corresponding stored dynamic data MAC 50. The cryptographic circuit 18 authenticates the stored static usage restriction data 44 by calculating a MAC as $f$ (key 24, stored static usage restriction data 44), and checking whether that result equals the stored static data MAC 46. Likewise, it authenticates the stored dynamic usage restriction data 48 by calculating a MAC as $f$ (key 24, stored dynamic usage restriction data 48), and checking whether that result equals the stored dynamic data MAC 50.

Because such authentication may be made a required part of secure domain processing, and because the secure watchdog timer circuit 60 guarantees that the system processor 32 is reset into secure mode, the device 10 can be forced to periodically verify the authenticity of its stored usage restriction data 14 (and forced to check the verified usage restriction data against the SIM currently attached to the device 10). Thus, even if an unauthorized change succeeds in temporarily running the device 10 in violation of its usage restrictions, that condition is short-lived and detected upon the timed or forced return of the system processor 32 to the secure mode.

In at least one embodiment, the stored usage restriction data 14 comprises SIMLock information, which may include static and dynamic parts. As before, the cryptographic circuit 18 is configured to generate and output a first MAC for the static part only as part of securely initializing the device 10, such that no changes to the static part will ever be authenticated by the cryptographic circuit 18. The cryptographic circuit 18 is further configured, as part of authorized changing of the dynamic part, to generate and output a new MAC for the dynamic part, to allow subsequent authentication of authorized changes to the dynamic part (of the stored usage restriction data 14).

In a more detailed example of the above SIMLock protection, it is helpful to reiterate that the SIMLock information is intended to restrict usage of the device 10 to contracted—for or paid—for features and privileges. For example, the SIMLock information may be configured to ensure that the device 10 remains locked to a particular network (or network subset, service provider, corporation or even individual SIM) until it is unlocked in an authorized manner. The SIMLock information thus represents a personalization of the allowed features for the device 10 with respect to its purchaser or user.

As such, the device 10 may be configured to read out information from the SIM card 76 upon startup or at other times, and ensure that such information checks against the usage limitations represented by the SIMLock information. Of course, the cryptographic circuit 18 may first be used to authenticate the SIMLock information, and to shut down or take another controlled action upon any authentication failures. For example, the device 10 may enter a "limited service state" in which only emergency calls can be attempted.

In at least one embodiment, there are five personalization categories that may be represented in and controlled by the SIMLock information stored as the usage restriction data 14 in the memory 12. Particularly, a number of "control keys" may be stored in encrypted or one-way hash form within the stored static usage restriction data 44. Changing a particular usage restriction thus requires a user to authorize against the corresponding control key.

Non-limiting examples of such control keys include a "Network Control Key" (NCK) within a Network category. In a Network subset category, the information may include a "Network Subset Control Key" (NSCK). In a Service Provider (SP) category, the information may include a "Service Provider Control Key" (SPCK). In a Corporate category, the information may include a "Corporate Control Key" (CCK). Finally, in a SIM/USIM category, the information may include a "Personalization Control Key" (PCK). (Thus, in at least one embodiment, the stored static usage restriction data 44 comprises authorization keys/passcodes for making restriction changes, and the dynamic usage restriction data 48 comprises restriction settings that can be modified subject to authorization.)

The above personalization categories are independent in so far as each category can be activated or de-activated regardless of the status of the others. This arrangement allows the device 10 to be initially (or later) personalized to one network, one network subset, one SP, one Corporate account, one SIM/USIM, or any combination thereof. In ensuring that all such key-based limitations are enforced, the SIMLock information provides a basis for comparing the different possible lock settings with a "subscriber identity field," e.g., the International Mobile Station Identifier (IMSI), which is securely stored on the SIM card 76. (Note that SIM card 76 is illustrated and discussed herein for simplicity, but the same functionality applies if a software-based SIM is installed in the device 10.)

For the above context, SIMLock information protection consists of three primary parts: protecting SIMLock unlocking codes, i.e., the static key or passcode values for authorizing changes; protecting the configured SIMLock settings, i.e., the dynamic restriction settings; and protecting against unauthorized reprogramming or alteration of any of the static and dynamic SIMLock information. The cryptographic circuit 18, including its secure/non-secure operating restrictions and its use of a device-unique key 24 securely accessed in the secure circuit 22, insures the above protections in an arrangement that provides robust security, economic implementation, simplified design, and advantageous dual use (secure/non-secure access) of the cryptographic circuit 18.

The teachings herein thus provide an apparatus and method for protecting usage restriction data that governs usage of an electronic device. In one or more embodiments, a the method comprises configuring a cryptographic circuit of the electronic device to perform only authentication of stored usage restriction data retrieved from a memory of the electronic device if the cryptographic circuit is non-securely accessed, and to perform generation of a new message authentication code for subsequent authentication of changed usage restriction data if the cryptographic circuit is securely accessed and commanded to perform said generation of the new message authentication code.

The method may further comprise storing a permanent device key securely in a secure circuit and connecting the secure circuit to the cryptographic circuit. Configuring the cryptographic circuit of the electronic device to perform only authentication of the stored usage restriction data if the cryptographic circuit is non-securely accessed may comprise configuring the cryptographic circuit to, for non-secure accesses, read in the stored usage restriction data and a corresponding stored MAC, read in the permanent device key, calculate a MAC from the stored usage restriction data using the permanent device key, and compare the calculated MAC to the stored message authentication code, while disallowing any outputting of the calculated MAC.

Further, configuring the cryptographic circuit of the electronic device to perform generation of the new MAC if the cryptographic circuit is securely accessed and commanded to perform said generation of the new MAC may comprise configuring the cryptographic circuit to be responsive to one or more generation commands if securely accessed. For example, the cryptographic circuit can be configured to respond to the appropriate command by reading in the permanent device key, calculating the new MAC from the changed usage restriction data using the permanent device key, and outputting the new MAC for storing in conjunction with the changed usage restriction data.

Of course, those skilled in the art will appreciate that the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. An electronic device comprising:
   a non-secure first memory for storing usage restriction data including: static usage restriction data comprising one or more authorization keys, each said key governing a corresponding device usage restriction setting; dynamic usage restriction data comprising said device usage restriction settings, with changes to each said restriction setting governed by the corresponding authorization key; a first message authentication code for authenticating said static usage restriction data; and a second message authentication code for authenticating said dynamic usage restriction data;
   a secure circuit holding a permanent device key accessible only through a direct connection to the secure circuit, and further holding a one-time programmable initialization indicator;
   a cryptographic circuit coupled to said secure circuit via said direction connection, and wherein said cryptographic circuit is configured to obtain said permanent key from said secure circuit for cryptographic processing by said cryptographic circuit but not to make said permanent key available to any other circuitry in said electronic device; and
   a system processor configured to selectively operate in a secure mode for securely accessing said cryptographic circuit, and in non-secure mode for non-securely accessing said cryptographic circuit; and
   wherein said cryptographic circuit is configured to:
      permanently lock said static usage restriction data to said electronic device by generating said first message authentication code only one time, in conjunction with being accessed in said secure mode at a time when said electronic device is un-initialized as indicated by said initialization indicator, wherein said cryptographic circuit generates said first message authentication code as a function of said permanent key and said static usage restriction data, for storage by said system processor in said first memory and then directs said secure circuit to permanently set said initialization indicator to an initialized state; and
      when accessed in a secure state after initialization of said electronic device, allow an authorized user to change one or more of said restriction settings governing usage of said electronic device, based on said cryptographic circuit verifying said static usage restriction data via said first message authentication code, and then generating a new second message authentication code as a function of any updated restriction settings and said permanent key, and providing said new second message authentication code to said system processor, for replacing said second message authentication code currently stored in said first memory.

2. The electronic device of claim 1, wherein the system processor is configured to start in the secure mode responsive to a reset and to periodically serve a secure watchdog timer, at least in part by authenticating the stored usage restriction data and checking it against Subscriber Identity Module (SIM) settings for the electronic device, said secure watchdog timer configured to reset the system processor unless periodically served by the system processor operating in the secure mode.

3. The electronic device of claim 1, wherein the secure circuit includes a plurality of one-time programmable elements and wherein a subset of the plurality of one-time programmable elements are configured to record the permanent device key as a secret key accessible to the cryptographic circuit.

4. The electronic device of claim 1, wherein the cryptographic circuit is operable, when securely accessed, to generate and output said new second message authentication code for the dynamic usage restriction data for storage in the first memory as the second stored message authentication code responsive to secure commands provided to it via secure access by the system processor, thereby enabling later authentication of authorized changes made to the dynamic part of the stored usage restriction data.

5. The electronic device of claim 1, wherein the stored usage restriction data comprises Subscriber Identity Module Lock information, and wherein the cryptographic circuit is configured to generate and output a first message authentication code for the static usage restriction data only as part of securely initializing the electronic device, such that no changes to the static usage restriction data will ever be authenticated by the cryptographic circuit, and wherein the cryptographic circuit is configured, as part of authorized changing of the dynamic usage restriction data, to generate and output a new second message authentication code for new dynamic usage restriction data, to allow subsequent authentication by said cryptographic circuit of authorized changes to the dynamic usage restriction data.

6. A method of protecting usage restriction data that governs usage of an electronic device comprising:
   storing said usage restriction data in a non-secure memory of the electronic device as static usage restriction data that can never be changed once the electronic device has been initialized, and further as dynamic usage restriction data that can be changed by an authorized user after the electronic device has been initialized, wherein said static usage restriction data comprises one or more authorization keys, each governing a corresponding one of one or more usage restriction settings comprising said dynamic usage restriction data;
   further storing in said non-secure memory first and second message authentication codes, for authenticating said static and dynamic usage restriction data, respectively, as a prerequisite for allowing normal operation of said electronic device;
   generating said first message authentication code as a function of said static usage restriction data and a permanent device key that is accessible only to a cryptographic circuit included in said electronic device, and restricting generation of said first message authentication code to occur only once, when said electronic device undergoes an authorized one-time initialization in a secure mode, so that any changes to said static usage restriction data after said authorized one-time initialization will cause an authorization failure that prevents normal operation of said electronic device; and generating, via said cryptographic circuit, a new second message authentication code as a function of new dynamic usage restriction data, in response to being so commanded by an authorized user accessing said secure device in a secure mode, and correspondingly storing said new second message authentication code in said non-secure memory in conjunction with said new dynamic usage restriction data, thereby allowing said authorized user to make changes to one or more of said usage restriction settings after device initialization; and restricting said electronic device from entering a normal operation mode for use by an end user by requiring, as part of secure startup operations of said electronic device, authentication by said cryptographic circuit of said static usage restriction data according to said first message authentication code, both as stored in said non-secure memory, and further authentication by said cryptographic circuit of said dynamic usage restriction data according to said second message authentication code, both as stored in said non-secure memory.

7. The method of claim 6, further comprising operating in the secure mode and in the non-secure mode based on a system processor of the electronic device dynamically changing between the secure and the non-secure modes of operation, and making authorized modification of the dynamic usage restriction data stored in said non-secure memory via execution by the system processor of secure program instructions.

8. The method of claim 7, further comprising storing the secure program instructions in a secure memory, said secure memory accessible by the system processor operating in the secure mode.

9. The method of claim 7, wherein the system processor is configured to start in the secure mode responsive to a reset and to periodically serve a secure watchdog timer, at least in part by authenticating the stored usage restriction data and checking it against Subscriber Identity Module (SIM) settings for the electronic device, and further comprising configuring said secure watchdog timer to reset the system processor unless periodically served by the system processor operating in the secure mode, to thereby force authentication of said stored usage restriction data.

10. The method of claim 6, further comprising indicating whether the electronic device has been initialized via a one-time programmable element included within the secure circuit.

11. The method of claim 10, further comprising storing the permanent device key within the secure circuit via a plurality of additional one-time programmable elements.

\* \* \* \* \*

UNITED STATES PATENT AND TRADEMARK OFFICE
CERTIFICATE OF CORRECTION

PATENT NO.        : 8,209,550 B2                                         Page 1 of 1
APPLICATION NO.   : 11/962356
DATED             : June 26, 2012
INVENTOR(S)       : Gehrmann It is certified that error appears in the above-identified patent and that said Letters Patent is hereby corrected as shown below:

In the Drawings:

In Fig. 8, Sheet 4 of 5, in Box "110", Line 3, delete "FRO" and insert -- FOR --, therefor.

In the Specification:

In Column 4, Line 14, delete " (SHA) 256. " and insert -- (SHA) 256. --, therefor.

In Column 8, Line 6, delete "Bock" and insert -- Block --, therefor.

Signed and Sealed this
Sixteenth Day of July, 2013

Teresa Stanek Rea
*Acting Director of the United States Patent and Trademark Office*